United States Patent [19]

Majewski

[11] Patent Number: 4,613,806
[45] Date of Patent: Sep. 23, 1986

[54] STEPPER MOTOR LOGIC CIRCUIT
[75] Inventor: Miroslawa Majewski, Detroit, Mich.
[73] Assignee: Allied Corporation, Morristown, N.J.
[21] Appl. No.: 692,968
[22] Filed: Jan. 22, 1985
[51] Int. Cl.[4] .............................................. H02P 8/00
[52] U.S. Cl. .................................... 318/696; 318/685
[58] Field of Search ....................... 318/696, 685, 138

[56] References Cited
U.S. PATENT DOCUMENTS
4,145,643  3/1979  Maeda et al. ....................... 318/696

*Primary Examiner*—William M. Shoop, Jr.
*Assistant Examiner*—Saul M. Bergmann
*Attorney, Agent, or Firm*—Leo H. McCormick, Jr.; Ken C. Decker

[57] ABSTRACT

A stepper motor logic circuit for providing stepper motor control signals to the drivers of a stepper motor. The stepper motor logic circuit receives programmable data from a CPU or manually-initiated back-up data for manually controlling the stepper motor. The logic circuit controls the stepper motor drivers in accordance with variable stepping rate data. Such data, as provided by the CPU, includes clock rate data and control data. The clock rate data written to the logic circuit determines the stepping rate; the control data determines the direction of stepper motor rotation, the step magnitude (full or half step), and the stop signal. Preferably, the logic circuit controls a pair of stepper motors independently of each other, by reading and storing separate clock rate and control data for each motor.

23 Claims, 8 Drawing Figures

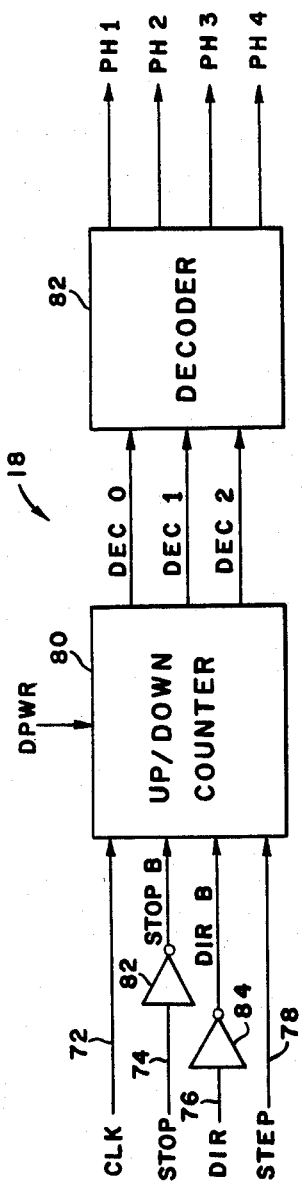

STEPPER MOTOR LOGIC CIRCUIT

BACKGROUND OF THE INVENTION

The present invention relates to a stepper motor logic circuit for providing stepper motor control signals to the drivers of a stepper motor. In particular, the stepper motor logic circuit interfaces with a central processing unit (CPU) to receive data indicative of the stepping rate (number of steps per unit of time) and to provide variable rate control signals to a four-phase stepper motor. The control signal outputs sequentially switch the four drivers of the stepper motor phases in accordance with the rate information that is written to the logic circuit by the CPU.

Stepper motor logic circuits that interface a CPU with stepper motor drivers are known in the art. Such logic circuits, known as variable step controllers, have been designed for stepping the motor a fixed number of steps. The CPU writes the number of steps, varying from 0 to 7, to the logic circuit which then steps the motor in accordance with the written number of steps at a constant rate. Such systems may include the ability to change the stepping rate in a limited manner in accordance with programmable rate data provided to the system; however, it is believed that such rate data remains constant during the stepper motor movement. Thus, such systems do not control the stepper motor by writing variable rate data to the logic circuit, but rather, by writing step data to the system which then drives the stepper motor at a constant rate until the steps have been completed.

A disadvantage of such system is that the stepper motor runs at a constant stepping rate, typically at the maximum stepping rate. At a maximum stepping rate, the torque output of the stepper motor remains at a minimum, an obvious disadvantage in certain applications.

Stepper motor control circuits that interface with a CPU are also shown in U.S. Pat. Nos. 4,234,830; 4,258,301; and 4,362,979. Although such patents describe systems that may change the stepper rate under certain conditions, they operate in a manner different from that of the instant invention.

SUMMARY OF THE INVENTION

The present invention provides for a novel stepper motor logic circuit that controls the drivers of a stepper motor in accordance with variable stepper motor rate data and control data that is provided by a CPU. Preferably, the logic circuit includes two stepper motor controllers for separately controlling two stepper motors. The stepper motor logic circuit receives, in the preferred embodiment, clock rate data from the CPU that can enable the stepping motor to step at up to 255 separate rates. Further, the logic circuit can receive control data from the CPU for directing the movement of the two stepper motors in a clockwise or counterclockwise direction at full steps or half-steps. As such, the present invention provides substantial control versatility. It can control the movement of the stepper motor at variable stepping rates, for variable time intervals, and can also control the stepper motor to move a predetermined number of steps by controlling the stepper motor to run at a predetermined rate for a predetermined time period. Thus, the stepper motor can be controlled to move at variable rates or at variable steps in accordance with the data written to the logic circuit by the CPU.

The present invention provides for receiving and storing, in a data latch, stepper motor clock rate data and control data. Such data can be updated continually during the system operation. The clock rate data is used to set an internal programmable clock that provides a series of stepper motor clocking pulses at a frequency determined by the input data. The stepper motor clocking pulses, and the control data, are applied to a logic circuit that provides outputs to drive the stepper motor at the programmed rate in a programmed direction and step magnitude. Each stepper motor is separately controllable in accordance with separate input data written to the system by the CPU.

The present invention further includes a back-up stepper motor control logic to control the stepper motors in accordance with control data from a manually actuated control source. When the system is placed in the back-up mode, one of the two stepper motors is activated to move in a predetermined direction for a predetermined time period, while the other stepper motor remains stationary. After such offset movement, the back-up system can then be manually controlled to move the stepper motors as requested.

It is an object of the present invention to provide a novel stepper motor logic circuit to interface a CPU with the drivers of a stepper motor, and preferably with a pair of independently controllable stepper motors. In particular, it is an object of the present invention to provide a stepper motor logic circuit capable of receiving clock rate data and control rate data from a CPU to control the stepper motor drivers at variable rates in accordance with the input data. With such a system, the stepper motors can be controlled to move at variable rates for variable time periods and at programmed step magnitudes, thus affording substantial flexibility in stepper motor control.

It is further an object of the present invention to provide a stepper motor logic circuit for independently controlling a pair of stepper motors in accordance with separate clock rate data and control data provided to the system by the CPU.

Still further, it is an object of the present invention to provide a stepper motor logic circuit for controlling a pair of stepper motors, wherein the stepper motors are independently programmable or are controllable by a manually actuated back-up system.

These and other objects of the invention will be apparent when reference is made to the foregoing detailed description.

BRIEF DESCRIPTION OF THE DRAWINGS

FIG. 3(a) is a block diagram of the motion logic circuit of FIG. 1; FIG. 3(b) is a truth table of the up/-down counter of FIG. 3(a); FIG. 3(c) is a truth table of the decoder circuit of FIG. 3(a).

DETAILED DESCRIPTION OF A PREFERRED EMBODIMENT

Figure 1:
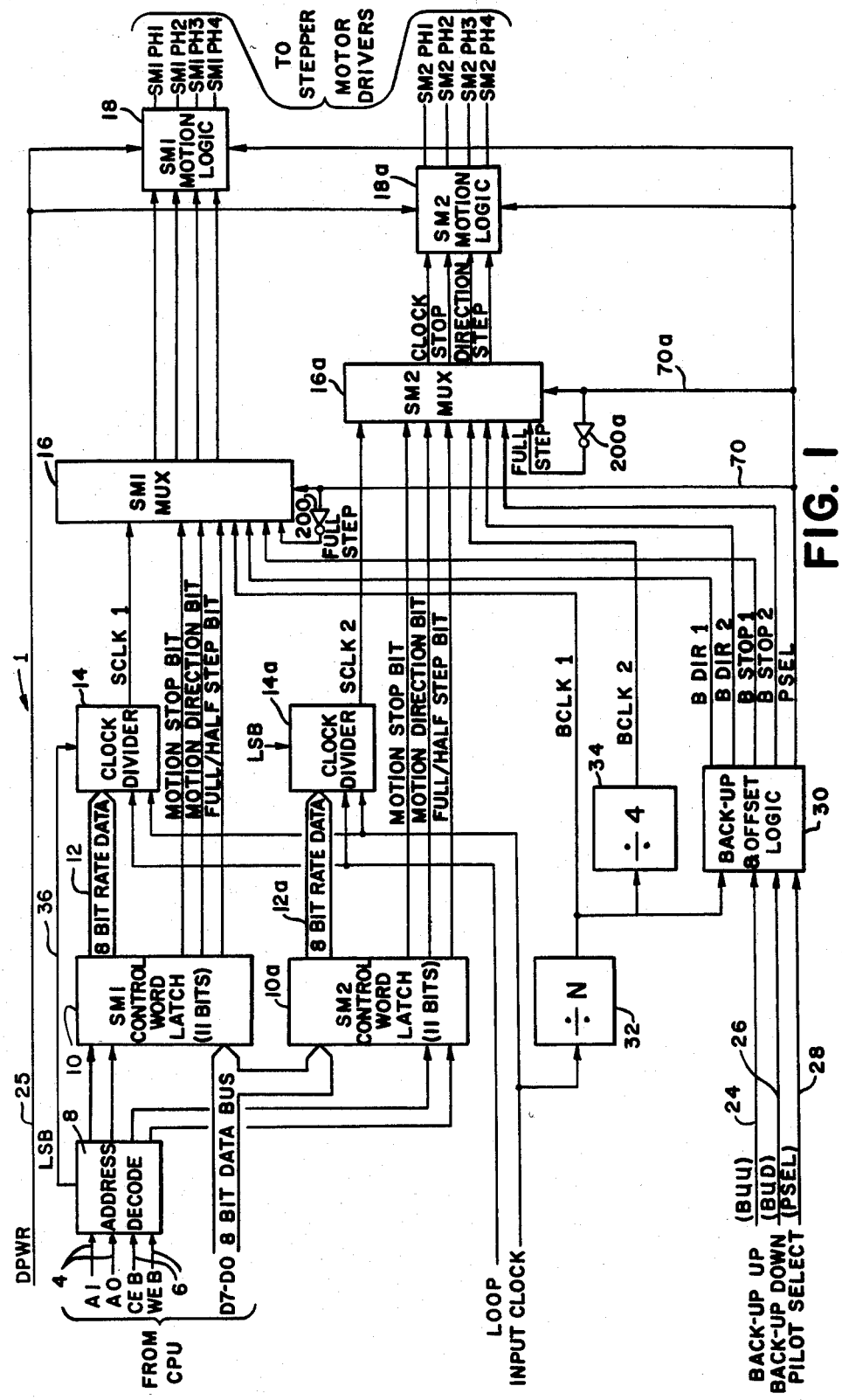
FIG. 1 is a block diagram depicting the stepper motor logic circuit of the instant invention.

The stepper motor logic circuit 1 of the present invention is depicted schematically in the block diagram of FIG. 1. The stepper motor logic circuit 1 is provided to interface a central processing unit (CPU), such as a microprocessor, to a pair of stepper motor drivers, each of which are coupled with a four-phase stepper motor (SM1 and SM2). The stepper motor drivers are connected to the four phases of the SM1 and SM2 stepper motors (not shown) in a conventional manner.

The CPU (not shown) interfaces with the stepper motor logic circuit 1 in a conventional manner via an eight-bit data bus 2, a pair of address line 4, and control lines 6. In the preferred embodiment, the CPU is a Texas Instruments SBP-9989 although other microprocessors can be used in their conventional manner. Data is written by the CPU to the stepper motor logic circuit 1 in accordance with address information decoded by a conventional address decoder 8 in a manner to be described. The data is written and latched in a control word latch circuit 10 for the SM1 stepper motor and control word latch circuit 10a for the SM2 stepper motor. The control word latches 10, 10a latch 11 bits of data received from the CPU. Eight bits of data represent the clock rate data and the remaining three bits of data represent control data, as will be described hereinbelow. The clock rate data is provided from the latch circuits 10, 10a over eight bit rate data line 12, 12a to clock divider circuits 14, 14a. The clock divider circuits 14, 14a provide stepping motor clocking pulses (SCLK1 and SCLK2) to multiplexers 16, 16a. The multiplexers 16, 16a also receive the control data from the control word latch 10, 10a. The multiplexers 16, 16a provide a four-bit parallel output representing the clock rate and control data to motion logic circuits 18, 18a which operate upon the incoming data to provide stepper motor control signals (PH1–PH4) to each of the stepper motors drivers SM1, SM2.

Also provided as inputs to the stepper motor logic circuit 1 is an input clock signal over line 20, which provides the input clock for controlling the system in a manner to be described. Preferably, the input clock is at a rate of 10 kHz. The input clock may be provided from a separate clock source or from the CPU.

A LOOP input 22 is provided to receive a LOOP logic signal for controlling the clock dividers 14, 14a in an open or closed loop mode to be described further below. The open or closed loop mode may be selected by a manually controlled logic source, by a decoded latch circuit controlled by the CPU, or may be hard-wired to operate in only one of the two modes.

The stepper motor logic circuit 1 may be disabled, or depowered, by a high-level input on DPWR line 24. When a high input is provided on DPWR line 25, the system is disabled unless the system is in a manual back-up mode as will be described below. The DPWR signal may be provided by a decoded latch circuit controlled by the CPU or by a manually actuated source.

The system further includes a back-up up (BUU) input 24, a back-up down (BUD) input 26, and a pilot select input (PSEL) input 28. These inputs are provided by manually controlled pulse sources, such as a Schmitt trigger circuit actuated by manual control switches, to provide logic 1 or 0 signals to a back-up and offset logic circuit 30. The back-up and offset logic circuit 30 includes various control line outputs provided to the multiplexers 16 and 16a to provide back-up and offset control signals via the multiplexers to the motion logic circuits 18 and 18a in a manner to be described.

The logic circuit 1 further includes a back-up clock 32 which is connected with the input clock over line 20 to divide the input clock rate by a predetermined value N. The output of clock divider 32 provides a back-up clock signal (BCLK1) to the motion logic circuit 18 for the SM1 controller via the multiplexer 16. The output of clock divider 32 is provided to a further clock divider 34 which divides the BCLK1 signal by a value of 4, in the preferred embodiment, to obtain a second back-up clock output (BCLK2) for the motion logic circuit 18a via the multiplexer 16a.

A detailed description of the stepper motor logic circuit 1 will now be described. As will be apparent, each stepper motor driver for the SM1 and SM2 stepper motors are independently programmable by the CPU, or manually controllable by the back-up circuit 30. As such, the control word latch 10, the clock divider 14, the multiplexer 16, and the motion logic circuit 18, which collectively control the SM1 motor, are identical in design and operation to the components 10a, 14a, 16a, and 18a, which control the SM2 motor. As such, only the programmable control system for the SM1 motor will be described in detail below, it being recognized that the SM2 controller operates in an identical manner.

The stepper motor logic circuit 1 is programmably controlled via data written by a CPU over the data bus 2, or manually controlled via back-up data provided via BUU and BUD lines 24, 26. When under the control of the CPU, the logic circuit 1 is powered-up, or enabled, via a control signal from the CPU over the DPWR line 24. When the system is to be depowered or disabled, a high-level, or "1" DPWR is provided over line 24; a low-level, or "0" input enables the circuit 1 to be controlled by the CPU. If the logic circuit is to be operated in the manual back-up mode, the pilot select line 28 receives a high-level PSEL signal from a manually controlled source, such as a switch-actuated Schmitt trigger circuit (not shown). Upon receipt of a high PSEL input, the logic circuit 1 is under manual back-up control regardless of the state of the DPWR input 25. That is, a manually initiated high PSEL signal overrides the programmable control function, if the DPWR input had been low, and also powers up, or enables, the logic circuit 1 if the logic circuit had been disabled or depowered by a high DPWR input. Further details of how the DPWR and the PSEL inputs control the logic circuit 1 will be described below.

When the DPWR and PSEL inputs are low, the logic circuit 1 is enabled and controllable by inputs from the CPU. The CPU then writes, in a conventional manner in accordance with its internal program stored in computer memory, two data bytes to the SM1 control word latch 10, and two data bytes to the SM2 control word latch 10a. The two data bytes written to each latch represent clock rate data and control data as will be described. The first data byte (the "most significant byte") includes only three data bits (in the "least significant bit" position); the second data byte (the "least significant byte") includes eight data bits. Thus, each control word latch 10, 10a, stores, or latches, eleven (11) data bits in a conventional manner.

The data bytes are written into the control word latch circuits 10, 10a, by address and control data from the CPU as decoded by the address decoder 8. As shown in FIG. 1, the address decoder circuit 8 includes four inputs; two address inputs over lines 4 and two control inputs over line 6. The control inputs include a chip enable input to enable the address decoder chip 8 when the input over the chip enable line is low, i.e., a CEB input is provided. (As used herein, the letter "B" following a signal indication indicates as inverted, or "not", signal.) Upon receipt of a WEB, or write enable low signal to the address decoder 8, data over the data bus 2 is latched, on the rising edge of the WEB signal, to one of the two control word latches 10, 10a in accordance with the A1 and A0 logic states on the address lines 4. The address information is decoded as follows:

| A1 | A0 | Description |
|----|----|-------------|
| 0  | 0  | Control Latch 10: 3 bits from Most Significant byte |
| 0  | 1  | Control Latch 10: 8 bits from Least Significant byte |
| 1  | 1  | Control Latch 10a: 3 bits from Most Significant byte |
| 1  | 1  | Control Latch 10a: 8 bits from Least Significant byte |

The above data is latched on the rising edge of WEB signal.

The three bits from the Most Significant byte represent the control data that is written to the logic circuit 1. These bits are the stop bit, the direction bit, and the full/half step bit. The stop bit, when set to a logic 1, will stop the stepper motor. The direction bit, when set to a logic 0, will move the stepper motor in a clockwise rotation; when set to a logic 1, will move the stepper motor in a counterclockwise rotation. Full step or half step motion is selected with the full/half step bit being a logic 0 or 1, respectively. This will be described further below.

The eight bits from the Least Significant byte represent the clock rate data that is written by the CPU. Such clock rate data will be a numerical value from 1 to 255. This clock rate data is operated upon by the clock divider 14, 14a, in a manner to be described below.

Thus, the stepper motor logic circuit 1 receives address and data signals from the CPU in accordance with the CPU's internal program. The CPU program writes the following information:

|   |   |   | A0 | A1 | D0 | D1 | D2 | D3 | D4 | D5 | D6 | D7 |
|---|---|---|----|----|----|----|----|----|----|----|----|----|
| 1. | Control word for SM1 | | | | | | | | | | | |
|   | a. | Most significant | 0 | 0 | X | X | X | X | X | $M_{FH}$ | $M_D$ | $M_S$ |
|   | b. | Least significant | 0 | 1 | $D_{MSB}$ | D | D | D | D | D | D | $D_{LSB}$ |
| 2. | Control word for SM2 | | | | | | | | | | | |
|   | a. | Most significant | 1 | 0 | X | X | X | X | X | $M_{FH}$ | $M_D$ | $M_S$ |
|   | b. | Least significant | 1 | 1 | $D_{MSB}$ | D | D | D | D | D | D | $D_{LSB}$ |

Where the Data $D_{MSB}$ thru $D_{LSB}$ is the 8-bit clock rate data;
$M_S$ is the Motion Stop bit;
$M_D$ is the Motion Direction bit; and
$M_{FH}$ is the full/Half Step bit The above eleven bits of data for each stepper motor control word latch 10, 10a are latched to provide eleven bits of information to the latch output. The latches 10, 10a are conventional latching circuits.

The eight bit clock rate data in the latch 10 is presented to a clock divider circuit 14. The three bit control data is presented by the control word latch 10 to multiplexer 16. The clock divider 14 further receives a signal via line 36 when new data is latched in the control word latch 10. That is, a signal from the address decoder 8 is provided when the Least Significant byte of information from the CPU is latched in the control word latch 10. The LSB signal is normally high and goes to a low, or "0" state when the Least Significant byte is latched.

Figure 2:
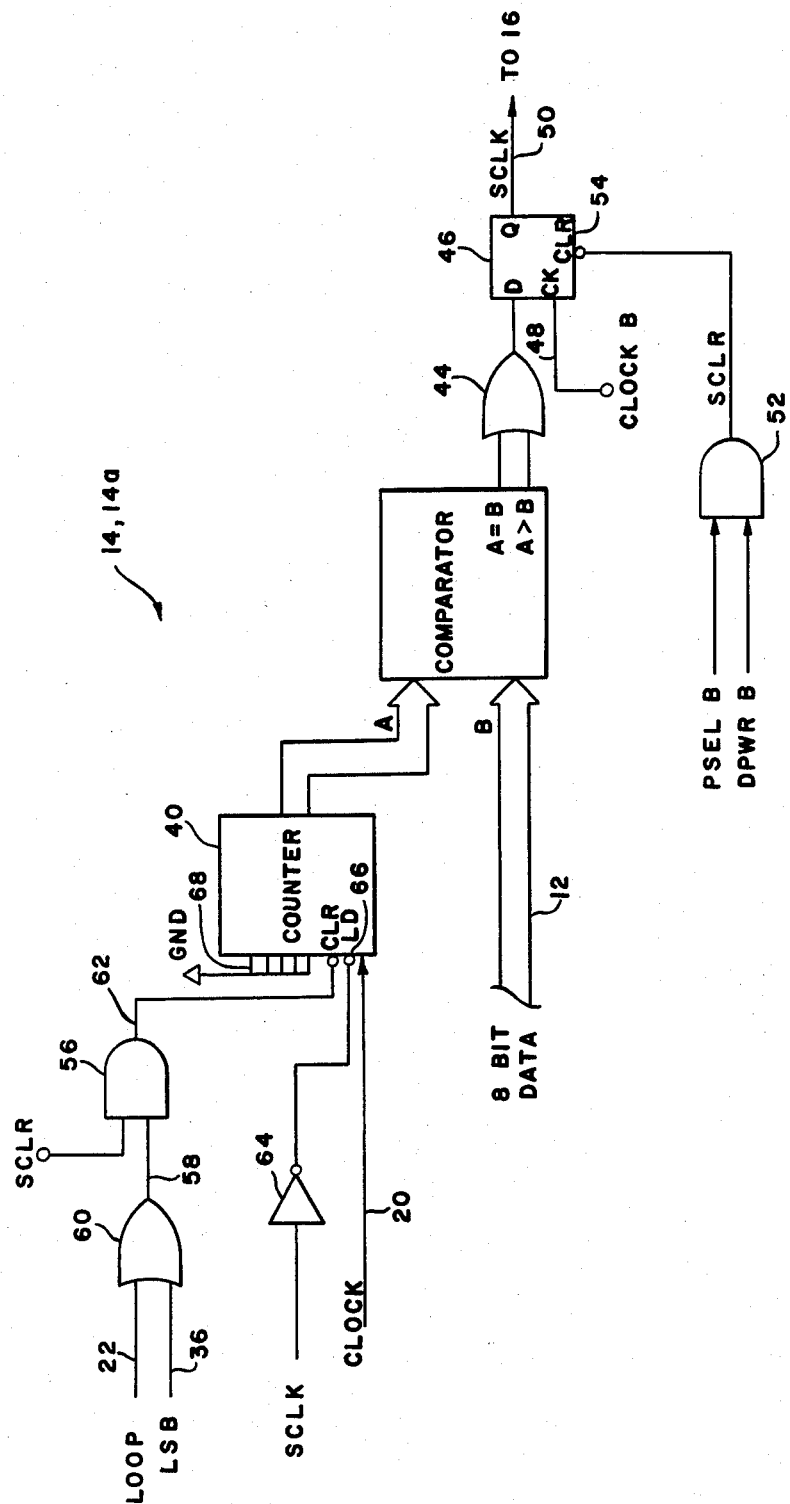
FIG. 2 is a schematic of the clock divider circuit of FIG. 1.

The clock divider circuit 14, 14a is depicted in greater detail in FIG. 2. As shown therein, input clocking pulses are provided over line 20 to an eight-bit counter 40. The counter 40 counts the incoming clock pulses and provides an eight-bit parallel clock count value "A" to a comparator 42. The comparator 42 also receives the eight-bit clock rate data, over bus 12, from the control word latch 10. The eight-bit parallel data provided to the comparator 42 is designated as "B". When the count value from the counter 40 (A) is equal to the eight-bit clock rate data (B), or when the count data A is greater than clock rate data B, a comparator 42 output pulse is provided via OR gate 44 to a D flip-flop register 46. The register 46 is clocked by the CLOCK B signal (the inverted input clock signal) over line 48 to provide a stepper motor clocking pulse (SCLK) at its output 50. This stepper motor clocking pulse is provided as an input to the multiplexer 16 as will be described below.

The register 46 is cleared, and thus disabled, when the logic circuit is depowered by a high input over the DPWR line 25 or upon receipt of a PSEL signal over line 28. That is, in the computer controlled mode, the PSEL and DPWR inputs are both low, making their inverted signals both high. These inverted signals are provided to an AND gate 52 which provides a high SCLR pulse. This pulse is inverted and provided to the clear input 54 of the register 46.

The SCLR pulse, which will normally be high unless the system is in a manual mode or has been depowered, is also provided as an input to AND gate 56. The other input of AND gate 56 is provided over line 58 from an OR gate 60. The OR gate 60 has two inputs; one from the LOOP line 22 and the other from the LSB line 36. The LSB input over line 36 is normally high, which provides a high output over line 58. The AND gate 56 output 62 is similarly high. This high signal is inverted and provided to the clear input of the counter 40. As was discussed above, the LOOP input is a low or high signal depending upon whether the system is operated in an open or a closed loop mode, respectively. Let us first assume that the LOOP input over line 22 is low (open loop mode). When a new control word is written by the CPU to the control word latch 10 (FIG. 1), the normally high LSB input over line 36 goes low to signify the writing of new data from the CPU. When this occurs, the output 58 of OR gate 60 goes low and the output of AND gate 56 (line 62) similarly goes low. The counter 40 is then cleared. Assume, on the other hand, that the LOOP input over line 22 is in a high state (closed loop mode). Then, the counter 40 is not cleared when a new data word is latched. That is, when the LSB line 36 goes low, the output 58 of OR gate 60 remains high since the loop input to the OR gate 60 (line 22) remains high.

It is thus seen that when the system is in the open loop mode, receipt of new data from the CPU clears the counter 40 to start counting from a value of zero. On the other hand, when the system is in a closed loop mode, the receipt of new data from the CPU does not clear the counter 40. The open loop mode is selected when it is desired to move the stepper motors a predetermined number of steps. By clearing the counter 40 for each control word update, the clock divider 14 starts at a known zero time state. The closed loop mode, on the other hand, would be selected for variable rate control of the stepper motors. In such mode, the counter 40 is not cleared on a control word update, but continues from previous clock counter data.

By way of example, if it were desired to move one of the stepper motors 100 steps, the CPU could write a clock rate data value of 100 for a one second interval (assuming an input clock of 10 kHz). The CPU would place the system in an open loop mode (LOOP=0) so that the counter 40 would be zeroed upon the latching of the clock rate data. This would assure that, upon the completion of the one second time interval, the precise 100 step movement occurred.

The counter 40 is also cleared, or loaded to a zero state upon each clocking pulse (SCLK) emitted over line 50. The SCLK pulse from the register 46 is provided as an input to inverter 64 which has a low output which, in turn, is inverted into the load (LD) input 66 of the counter 40. The counter 40 then loads the inputs 68 which are all preset at a ground or zero value. Thus, the counter 40 starts from a zero value upon each stepper motor clocking pulse (SCLK) being provided to the multiplexer 16.

As was mentioned above, the comparator 42 provides an output pulse through OR gate 44 when the eight-bit clock rate data (B) is greater than the count value (A) of the counter 40. This would occur upon receipt of updated count rate data over line 12 which is greater than the present count value A from the counter 40. For example, if the counter value A is at a value of "5", and new eight-bit data B is written to the system having a value of "10", the comparator will immediately provide an output through the OR gate 44, which results in the issuance of a clocking pulse over line 50. The counter 40 will then be reset.

It is thus seen that the circuit 14, 14a is a clock divider circuit, wherein the clocking pulses (SCLK) occur at a frequency equal to the input clock frequency divided by the numerical clock rate data value that is written to the system. By continually updating the clock rate data, the frequency of the stepper motor clocking pulses SCLK is continually changed.

With reference to FIG. 1, the clocking pulses SCLK from the clock divider circuit 14, along with the three control bit pulses from the control word latch 10, are provided as inputs to the multiplexer 16. Also provided as inputs to the multiplexer 16, as will be described below, are clocking pulses from the back-up clock 32, and control pulses from the back-up and offset logic 30. The multiplexer 16 selectively transfers the programmable clocking and control pulses or the back-up clocking and control pulses in accordance with the status of the pilot select control signal. That is, if the system is in the manual backup mode, so that the PSEL pulse is high, the multiplexer 16 transfers data from the back-up system, whereas if the PSEL pulse is low, the multiplexer 16 transfers the clocking and control data from the clock divider 14 and control latch 10, respectively. The PSEL pulse is provided to control the multiplexer 16 via the line 70 (and 70a) as schematically shown in FIG. 1. The multiplexer 16 has four output lines 72, 74, 76 and 78 which are provided to the input of motion logic circuit 18. The motion logic circuit 18 is depicted, in greater detail, in FIGS. 3 and 4.

With reference to FIG. 3(a), the clocking pulse (CLK) and full/half step pulse is provided to the input of an up/down counter 80 over lines 72 and 78. The step pulse is provided over line 74 and inverted by inverter 82 to provide a STOP B input to the up/down counter 80. Similarly, the direction bit is provided over line 76, through inverter 84, to provide a DIR B to the up/down counter. It is thus seen that, upon receipt of a clocking pulse over line 72, four distinct pulses having varying logic states will be provided as the inputs to the up/down counter 80. Further, the up/down counter 80 will be disabled if the DPWR input is at a logic 1 state.

The up/down counter 80 is configured to count in an upward or downward direction by a count value of 1 or 2, depending upon the logic states of the four inputs to the counter 80. The up/down counter provides a binary parallel output over lines DEC0, DEC1 and DEC2. With reference to FIG. 3(b), the various control signals to the up/down counter are indicated. For example, if the CLK, STOP, DIR and STEP inputs are 1, 0, 0, 1, respectively, the up/down counter counts in an upward direction by a value of 1. That is, upon each receipt of the clocking pulse over line 72, the up/down counter counts upward from a value of "0 0 0" to a value of "1 1 1", and then starts over from a value of "0 0 0". Similarly, if the CLK, STOP, DIR, and STEP inputs are 1, 0, 0, 0, respectively, the up/down counter 80 will count up by a value of 2. That is, upon receipt of each CLK pulse over line 72, the outputs of the up/down counter 80 are, in binary form, 0, 2, 4, 6, and then back to 0. The other codes for controlling the up/down counter 80 are shown in FIG. 3(b). Note that if the stop bit over line 74 is a high or "1" state, the up/down counter 80 is stopped and its output remains at the last count value. The count progression of the outputs DEC0 through DEC2 of the up/down counter 80 is shown in FIG. 3(c).

The three-line output of the up/down counter 80 is provided as an input to decoder circuit 82. Decoder circuit 82 decodes the numerical binary values received over the DEC0, DEC1 and DEC2 lines to provide a four-bit parallel output over output lines PH1-PH4. The decoder 82 is a logic circuit that converts the numerical value of the three inputs to predetermined output values. FIG. 3(c) discloses the truth table for the decoder circuit 82. With respect to the uppermost chart on FIG. 3(c), it is seen that as the up/down counter outputs are incremented by a value of 1, the PH1-PH4 outputs logic states are changed to drive the stepper motor drivers in a clockwise direction by a half-step magnitude. Similarly, with reference to the bottommost chart of FIG. 3(c), the outputs of the up/down counter 80 to the decoder 82 provide PH1-PH4 outputs to step the stepper motors in a clockwise direction at full-step magnitudes. If the up/down counter counts in a downward direction, similarly, the PH1-PH4 outputs change their logic states so as to control the stepper motor drivers in a counterclockwise direction.

Figure 4A:
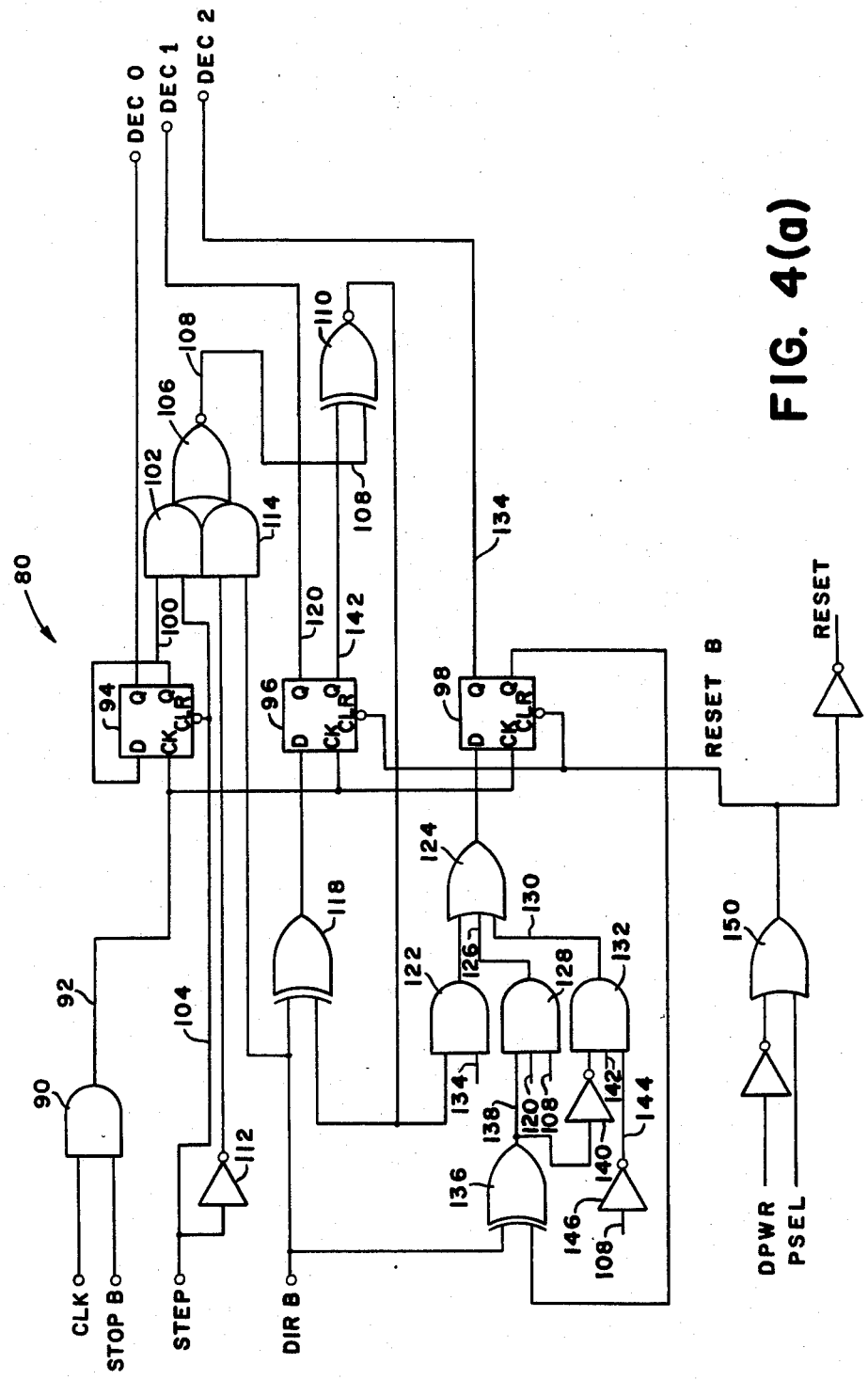
FIG. 4(a) is a schematic of the up/downn counter of FIG. 3(a)
Figure 4B:
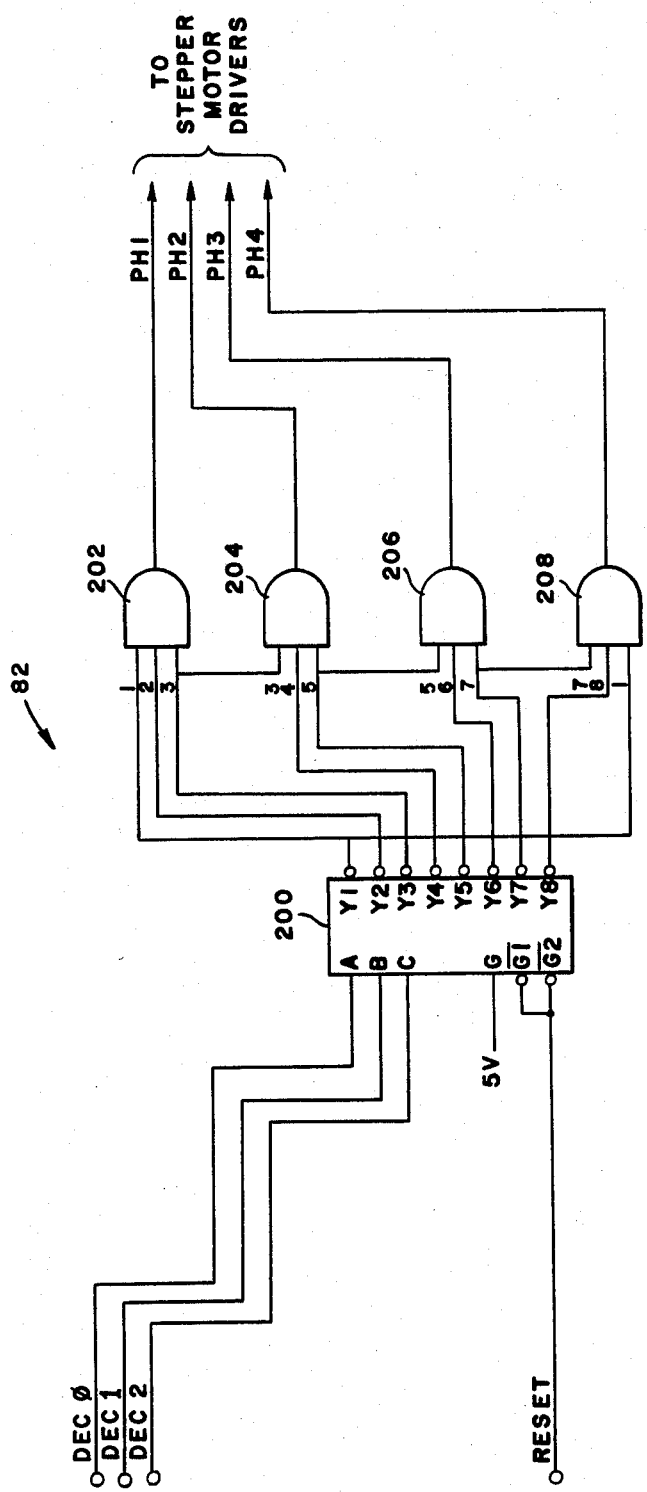
FIG. 4(b) is a schematic of the decoder circuit of FIG. 3(a).

The up/down counter 80 is depicted in greater detail in FIG. 4(a), and the decoder 82 is depicted in FIG. 4(b). With reference to FIG. 4(a), the CLK and STOP B inputs are provided to an AND gate 90 having an output 92 coupled with the clock inputs of flip-flops 94, 96, and 98. Flip-flop 94 output over the Q terminal is provided to the DEC0 line. The Q not output of flip-flop 94 is fed back to the D input of flip-flop 94, and as an input, over line 100, to AND gate 102. The other input to AND gate 102 is over line 104, which receives the step input signal. The output of AND gate 102 is connected to one input of NOR gate 106, the output of which is provided, over line 108, as an input to exclusive NOR gate 110.

The step input to counter 80 is inverted by inverter 112 and provided as an input to AND gate 114. The other input to AND gate 114 is over line 116, which receives the DIR B input. The DIR B input over line 116 is also provided as an input to exclusive OR gate 118, the output of which is provided as the input to D terminal of flip-flop 96. The Q output terminal of flip-flop 96 is provided over output line 120 to provide the DEC1 output of the up/down counter 80. The other input to exclusive OR gate 118 is provided by the output of exclusive NOR gate 110. Such output is also provided as an input to AND gate 122.

The output of AND gate 122 is provided as an input to OR gate 124. The OR gate 124 has two other inputs; input 126 from AND gate 128, and input 130 from AND gate 132. The output of OR gate 124 is provided to the D input of flip-flop 98. The flip-flop 98 has a Q output over line 134 which provides the DEC 2 signal to the decoder 82.

The Q not output of flip-flop 98 is provided as an input to exclusive OR gate 136. The other input to the exclusive OR gate 136 is provided by the DIR B input signal. The output of exclusive OR gate 136 is provided, over line 138, to an inverter 140, the output of which is connected to the input of AND gate 132. Similarly, the line 138 is provided as an input to AND gate 128.

AND gate 122 has a second input coupled with the output 134 of flip-flop 98. AND gate 128 has two additional inputs; one input is the output 120 of flip-flop 96, and the other input is from the output 108 of OR gate 106. AND gate 132 has two additional inputs; one input is from the Q not output 142 of flip-flop 96, whereas the other input is over line 144 which is the output of NOR gate 146. Input to NOR gate 146 is from output 108 of NOR gate 106.

Flip-flops 96 and 98 receive RESETB inputs to their inverted clear terminals. The RESETB line is connected with OR gate 150, which has two inputs; one input is the PSEL input, and the other input is the inverted DPWR input.

In summary, the up/down counter circuit 80 will sequentially receive the four inputs and will count in an upward or downward direction, by a value of 1 or 2, depending upon the logic states of the four input values. The numerical count values are provided over the DEC0, DEC1 and DEC2 outputs of the counter 80, which are, in turn, provided as inputs to the decoder circuit 82, which is depicted in FIG. 4(b).

The decoder 82 is shown in FIG. 4(b). The DEC0, DEC1, DEC2 outputs of up/down counter 80 are provided to a conventional three to eight decoder chip 200. The eight outputs of the decoder chip are inverted and provided, as shown, to inputs of NAND gates 202, 204, 206, and 208. The outputs of the NAND gates provide the PH1-PH4 control signals that are coupled with the stepper motor drivers (not shown).

The decoder circuit 82 decodes the numerical values provided at the DEC0-DEC2 inputs in accordance with the truth table as shown in FIG. 3(c). Thus, as the numerical values of the inputs to the decoder circuit 82 are updated, at a rate in accordance with the clocking pulses provided by the clock divider circuit 14, the PH1-PH4 outputs sequentially change to control the stepper motor in a conventional manner.

Let us now consider how the manual back-up and offset system operates. With reference to FIG. 1, the multiplexer 16 receives clocking pulses (BCLK1) from back-up clock source 32, and receives control data (back-up direction bit, BDIR1; back-up stop bit, BSTOP1) from the backup and offset logic circuit 30. In the back-up mode, only a full step movement is possible; the full step bit is obtained by inverting the PSEL input 70 via inverter 200, thus providing a logic "0" as the STEP bit. Similarly, the multiplexer 16a for the SM2 motor receives clocking pulses (BCLK2) from the back-up clock source 34, and receives control data (BDIR2, BSTOP2) from the back-up and offset logic 30. The STEP bit is set to "0" by inverting the PSEL input, over line 70a, by inverter 200a.

When the manual back-up mode is selected, by a manually-initiated high PSEL pulse over line 28, the multiplexers 16, 16a, are set (by PSEL inputs 70, 70a from back-up circuit 30) to pass the back-up clocking pulses and back-up control data to the multiplexer output lines 72 through 78. The motion logic circuit 18 receives such back-up data, and operates upon such data, in the same manner as discussed above.

Figure 5:
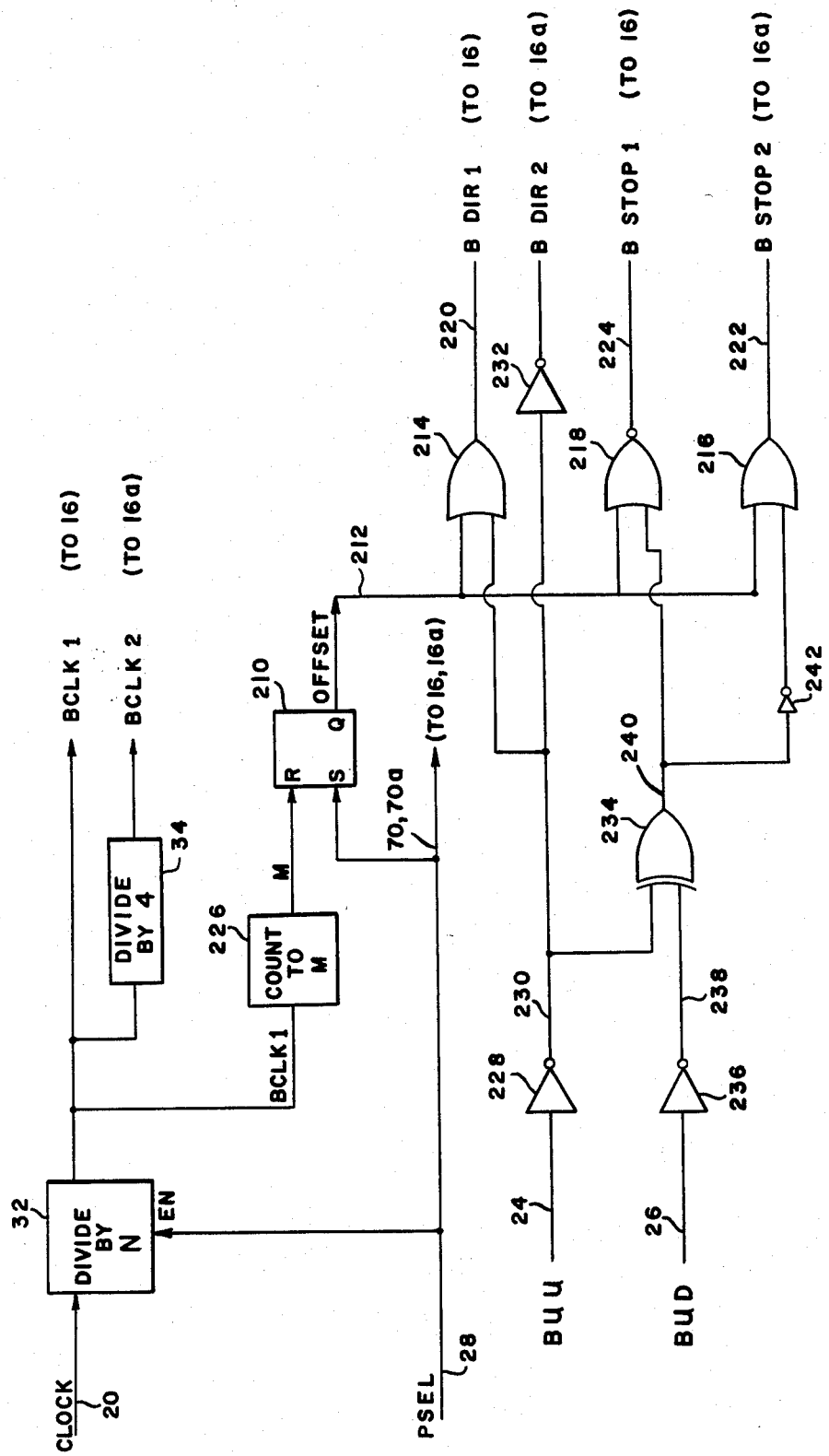
FIG. 5 is a schematic of the back-up clocks and back-up and offset logic of FIG. 1.

The back-up clocks and back-up and offset logic 30 are depicted in FIG. 5. Back-up clock 32 receives the incoming clock pulses over line 20, when enabled by a high PSEL input over line 28, and divides the input clock frequency by a predetermined value N. The value N may be pre-set in advance and typically is a value from 20 to 70. The back-up clock 32 may be any conventional clock divider circuit and may include a counter and comparator configured in a manner similar to the clock 14 in FIG. 2. The clocking pulses (BCLK1) from the clock 32 are provided to the multiplexer 16.

The back-up clock for the SM2 multiplexer 16a is provided by a clock divider 34 having its input source connected to receive the BCLK1 signals. In the preferred embodiment, the divider 34 divides the BCLK1 pulses by a value of 4 to obtain the BCLK2 clocking pulses which are provided to multiplexer 16a. It should be apparent that other divider values may be chosen.

Turning now to the back-up and offset logic 30 of FIG. 5, when a low to high transition of PSEL occurs, the logic system is designed to move the SM1 motor a predetermined number of steps in a counterclockwise direction, while disabling the SM2 motor. This is accomplished in the following manner. A high PSEL pulse over line 28 is provided to the set (S) input of flip-flop 210 which provides a high OFFSET pulse over line 212. The high OFFSET pulse is provided to OR gates 214 and 216 and to NOR gate 218. The output 220 of OR gate 214 goes high and is the back-up direction control (BDIR1) to multiplexer 16. The output 222 of OR gate 216 similarly goes high and is the back-up stop control (BSTOP2) to multiplexer 16a. (The SM2 motor is thus disabled). The output 224 of NOR gate 218 is low and is the back-up stop control (BSTOP1) to multiplexer 16. (The SM1 motor is enabled.) Thus, so long as the OFFSET output 212 of flip-flop 210 is high, the multiplexer 16 passes BCLK1 clocking pulses, and control pulses BDIR1 equal to 1, BSTOP1 equal to 0, and full step equal to 0. This data is provided to the up/down counter 80 and, as shown in FIG. 3(b), will cause the counter 80 to count down by 2 upon each receipt of a BCLK1 clocking pulse. This activates the SM1 motor in a counterclockwise full step direction.

The offset line 212 will stay high until the flip-flop 210 is reset. The resetting of flip-flop 210 occurs in the following manner. A counter 226 is preset to count to a predetermined value M. The counter 226 receives the back-up clocking pulses (BCLK1) from counter 32 and counts such pulses until M is reached. When the count of M is reached, the counter resets the flip-flop 210. It is thus seen that when the system is first placed in the manual back-up mode, the SM1 motor is offset a predetermined number of steps depending on the preset value M. Typically, M is preset to a value between 40 and 140.

When the count value M of counter 226 is reached, the OFFSET line 212 goes low, thus enabling the back-up logic circuit 30 to be controlled by the back-up up (BUU) and back-up down (BUD) inputs 24, 26. The back-up up (BUU) input 24 is connected to inverter 228, having an output 230 which is connected to the inputs of OR gate 214, inverter 232, and exclusive OR gate 234. The output of inverter 232 provides the back-up direction control bit for the SM2 motor (BDIR2). The back-up down (BUD) input 26 is connected to inverter 236, having an output 238 connected to the input of exclusive OR gate 234. The output 240 of exclusive OR gate 234 is connected to an input of NOR gate 218 and to an inverter 242, whose output is provided as an input to OR gate 216. The output 224 of NOR gate 218 is the back-up stop control bit of the SM1 motor (BSTOP1). The output 222 of OR gate 216 is the back-up stop control bit of the SM2 motor (BSTOP2).

A truth table for the back-up direction and stop bits can be expressed as follows:

| BUU | BUD | BDIR1 | BDIR2 | BSTOP1 | BSTOP2 |
|-----|-----|-------|-------|--------|--------|
| 0   | 0   | 1     | 0     | 1      | 1      |
| 1   | 1   | 0     | 1     | 1      | 1      |
| 0   | 1   | 1     | 0     | 0      | 0      |
| 1   | 0   | 0     | 1     | 0      | 0      |

From the above logic, it is seen that the SM1 and SM2 motors can be manually controlled whereby one of the motors is driven in one direction and the other motor is driven in the opposite direction in accordance with the two back-up clock rates (BCLK1 and BCLK2). As discussed above, the motors are driven at a full step magnitude.

I claim:

1. A stepper motor logic circuit for providing stepper motor at variable rates, comprising:
   data input means for storing clock rate data and stepper motor control data;
   stepper motor clocking means connected with said data input means for receiving the clock rate data and for providing a series of stepper motor clocking pulses at a frequency proportional to the clock rate data; and
   logic means for receiving the series of stepper motor clocking pulses and the stepper motor control data and for providing at its output a digital stepper motor control signal having a logic state determined in accordance with the stepper motor control data, said stepper motor control signal provided at a rate proportional to the frequency of the stepper motor clocking pulses, and logic means including a counter means for receiving the stepper motor clocking pulses and the stepper motor control data and for providing a series of counter output signals at a rate proportional to the frequency of the stepper motor clocking pulses, each said counter output signal having a digital numerical value that changes in accordance with the stepper motor control data, said logic means further comprising a decoding means for receiving and decoding the counter output signals and for changing the logic state of the stepper motor control signal in accordance with the decoded numerical values of said counter output signals.

2. A stepper motor logic circuit as claimed in claim 1 wherein said data input means includes means for storing stepper motor control data comprising a direction bit, a full step/half step bit, and a stop bit.

3. A stepper motor logic circuit as claimed in claim 2 wherein said counter means counts the stepper motor clocking pulses in an upward or downward direction in accordance with the logic state of the direction bit, and counts by a value of one or two in accordance with the logic state of the full step/half step bit.

4. A stepper motor logic circuit as claimed in claim 1 wherein said data input means comprises means for receiving the clock rate data and the stepper motor control data over a data bus from a central processing unit, said clock rate data comprising an eight-bit data word and said stepper motor control data comprising a three-bit data word.

5. A stepper motor logic circuit as claimed in claim 4 wherein said data input means further comprises a latch means for storing the eight-bit data word and the three-bit data word.

6. A stepper motor logic circuit as claimed in claim 1 wherein said stepper motor clocking means includes means for receiving a periodic input clock signal, input clock counting means for counting the periodic input clock signal, comparator means for comparing the clock rate data with the count of the input clock counting means and for providing a stepper motor clocking pulse when the count of the input clock counting means is equal to or greater than the clock rate data.

7. A stepper motor logic circuit as claimed in claim 6 wherein said input clock counting means is reset by the stepper motor clocking pulse.

8. A stepper motor logic circuit as claimed in claim 6 wherein said data input means includes means for receiving the clock rate data and the stepper motor control data over a data bus from a central processing unit, latch means for storing the clock rate data and the stepper motor control data, and a latch signal means for providing a latch pulse signal upon storage of said clock rate data and stepper motor control data, and wherein said stepper motor clocking means includes means for receiving the latch pulse signal and for clearing the input clock counting means upon receipt of said latch pulse signal.

9. A stepper motor logic signal as claimed in claim 1 wherein said logic means provides the stepper motor control signal to a driving means of a stepper motor.

10. A stepper motor logic circuit as claimed in claim 1 wherein said stepper motor control signal comprises a four-bit data word, the logic states of said four-bit data word determined in accordance with the stepper motor control data.

11. A stepper motor logic circuit for providing stepper motor control signals to the drivers of a stepper motor at a variable rate comprising:
  programmable clocking means for receiving clock rate data from a central processing unit and for providing a series of programmable stepper motor clocking pulses at a frequency proportional to said clock rate data;
  back-up clocking means for providing a series of back-up stepper motor clocking pulses at a predetermined frequency;
  first control data input means for receiving from a central processing unit, and storing, programmable stepper motor control data;
  second control data input means for receiving back-up stepper motor control data from a manually-actuated control source;
  logic means for receiving stepper motor clocking pulses and stepper motor control data and for providing a digital stepper motor control signal to a stepper motor driving means, said stepper motor control signal having a logic state in accordance with the stepper motor control data and provided at a rate proportional to the frequency of the stepper motor clocking pulses; and
  selection means for selectably connecting said programmable clocking means and said first control data input means, or, said back-up clocking means and said second control data input means, to said logic means.

12. A stepper motor logic circuit as claimed in claim 11 wherein said selection means comprises a multiplexing means having multiplex inputs connected with said programmable clocking means, said back-up clocking means and said first and second control data input means, and having multiplex outputs connected with said logic means, said selection means further comprising manually-actuable selection control signal means for providing a selection control signal to said multiplexing means.

13. A stepper motor logic circuit as claimed in claim 12 further comprising offset means for generating predetermined offset stepper motor control data in response to receipt of said selection control signal and for providing said offset stepper motor control data to said second control data input means.

14. A stepper motor logic circuit for providing stepper motor control signals to the drivers of a stepper motor at variable rates, comprising:
  data input means for storing clock rate data and stepper motor control data, said data input means having means for receiving the clock rate data and the stepper motor control data over a data bus from a central processing unit, said clock rate data comprising an eight-bit data word and said stepper motor control data comprising a three-bit data word;
  stepper motor clocking means connected with said data input means for receiving the clock rate data and for providing a series of stepper motor clocking pulses at a frequency proportional to the clock rate data; and
  logic means for receiving the series of stepper motor clocking pulses and the stepper motor control data and for providing at its output a digital stepper motor control signal having a logic state determined in accordance with the stepper motor control data, said stepper motor control signal provided at a rate proportional to the frequency of the stepper motor clocking pulses.

15. A stepper motor logic circuit as claimed in claim 14 wherein said logic means comprises a counter means for receiving the stepper motor clocking pulses and the stepper motor control data and for providing a series of counter output signals at a rate proportional to the frequency of the stepper motor clocking pulses, each said counter output signal having a digital numerical value that changes in accordance with the stepper motor control data, said logic means further comprising a decoding means for receiving and decoding the counter output signals and for changing the logic state of the stepper motor control signal in accordance with the decoded numerical values of said counter output signals.

16. A stepper motor logic circuit as claimed in claim 15 wherein said data input means includes means for storing stepper motor control data comprising a direction bit, a full step/half step bit, and a stop bit.

17. A stepper motor logic circuit as claimed in claim 14 wherein said counter means counts the stepper motor clocking pulses in an upward or downward direction in accordance with the logic state of the direction bit, and counts by a value of one or two in accordance with the logic state of the full step/half step bit.

18. A stepper motor logic circuit as claimed in claim 14 wherein said data input means further comprises a latch means for storing the eight-bit data word and the three-bit data word.

19. A stepper motor logic circuit as claimed in claim 14 wherein said stepper motor clocking means includes means for receiving a periodic input clock signal, input clock counting means for counting the periodic input clock signal, comparator means for comparing the clock rate data with the count of the input clock counting means and for providing a stepper motor clocking pulse when the count of the input clock counting means is equal to or greater than the clock rate data.

20. A stepper motor logic circuit as claimed in claim 19 wherein said input clock counting means is reset by the stepper motor clocking pulse.

21. A stepper motor logic circuit as claimed in claim 19 wherein said data input means includes means for receiving the clock rate data and the stepper motor control data over a data bus from a central processing unit, latch means for storing the clock rate data and the stepper motor control data, and a latch signal means for providing a latch pulse signal upon storage of said clock rate data and stepper motor control data, and wherein said stepper motor clocking means includes means for receiving the latch pulse signal and for clearing the input clock counting means upon receipt of said latch pulse signal.

22. A stepper motor logic signal as claimed in claim 14 wherein said logic means provides the stepper motor control signal to a driving means of a stepper motor.

23. A stepper motor logic circuit as claimed in claim 14 wherein said stepper motor control signal comprises a four-bit data word, the logic states of said four-bit data word determined in accordance with the stepper motor control data.

* * * * *